(12) United States Patent
Sato et al.

(10) Patent No.: US 7,342,769 B2
(45) Date of Patent: Mar. 11, 2008

(54) ELECTRIC DOUBLE-LAYER CAPACITOR

(75) Inventors: Takaya Sato, Chiba (JP); Gen Masuda, Chiba (JP); Mitsugu Kotani, Chiba (JP); Shunsuke Iizuka, Chiba (JP)

(73) Assignee: Nisshinbo Industries, Inc., Chu-ku, Tokyo (JP)

( * ) Notice: Subject to any disclaimer, the term of this patent is extended or adjusted under 35 U.S.C. 154(b) by 95 days.

(21) Appl. No.: 10/525,201

(22) PCT Filed: Aug. 22, 2003

(86) PCT No.: PCT/JP03/10630

§ 371 (c)(1),
(2), (4) Date: Feb. 22, 2005

(87) PCT Pub. No.: WO2004/019356

PCT Pub. Date: Mar. 4, 2004

(65) Prior Publication Data

US 2006/0176646 A1    Aug. 10, 2006

(30) Foreign Application Priority Data

Aug. 23, 2002  (JP) .............................. 2002-243236

(51) Int. Cl.
*H01G 9/00* (2006.01)
(52) U.S. Cl. ....................................... 361/502; 361/503
(58) Field of Classification Search ........ 361/502–503; 252/62.2
See application file for complete search history.

(56) References Cited

U.S. PATENT DOCUMENTS

| | | | |
|---|---|---|---|
| 3,652,902 A * | 3/1972 | Hart et al. ................... | 361/502 |
| 4,482,713 A | 11/1984 | Strickler | |
| 4,725,926 A | 2/1988 | Morimoto et al. | |
| 2004/0094741 A1 | 5/2004 | Sato et al. | |
| 2004/0199015 A1 * | 10/2004 | Yuyama et al. ............. | 564/292 |

FOREIGN PATENT DOCUMENTS

| | | |
|---|---|---|
| EP | 0 927 778 A1 | 7/1999 |
| JP | 58-10542 A | 1/1983 |
| JP | 61-32509 A | 2/1986 |
| JP | 62-252927 A | 11/1987 |

(Continued)

OTHER PUBLICATIONS

Cooper, E. I. et al., "Ambient Temperature Plastic Crystal Fast Ion Conduct ORS (PLICFICS)", Solid State Ionics, 1986, vol. 18 & 19, p. 570-576.
English language translation of JP 7-249551 (Sep. 26, 1995).

*Primary Examiner*—Eric Thomas
(74) *Attorney, Agent, or Firm*—Birch, Stewart, Kolasch & Birch, LLP (57) ABSTRACT

In an electrical double-layer capacitor having a pair of polarizable electrodes, a separator between the polarizable electrodes and a liquid electrolyte, the polarizable electrodes contain as a main component an activated carbon having micropores with a pore radius distribution peak as determined by the MP method within a range of $4.0 \times 10^{-10}$ to $8.0 \times 10^{-10}$ m, and the liquid electrolyte includes an electrolyte salt which is an ionic liquid. Such electrical double-layer capacitors have excellent low-temperature characteristics and a high electrostatic capacitance.

9 Claims, 2 Drawing Sheets

FOREIGN PATENT DOCUMENTS

| | | |
|---|---|---|
| JP | 63-173312 A | 7/1988 |
| JP | 3-54109 A | 3/1991 |
| JP | 4-349365 A | 12/1992 |
| JP | 5-43345 A | 2/1993 |
| JP | 6-61095 A | 3/1994 |
| JP | 7-249551 A | 9/1995 |
| JP | 9-275042 A | 10/1997 |
| JP | 10-55717 A | 2/1998 |
| JP | 11-222732 A | 8/1999 |
| JP | 11-297355 A | 10/1999 |
| JP | 2002-110472 A | 4/2002 |
| WO | WO-02/076924 A1 | 10/2002 |

* cited by examiner

ELECTRIC DOUBLE-LAYER CAPACITOR

TECHNICAL FIELD

The present invention relates to electrical double-layer capacitors. More particularly, it relates to electrical double-layer capacitors having excellent low-temperature characteristics and a high electrostatic capacitance.

BACKGROUND ART

Nonaqueous liquid electrolyte-type electrical double-layer capacitors can be charged and discharged at a high current, and thus hold considerable promise as energy storage devices for such applications as electric cars and auxiliary power supplies.

Prior-art nonaqueous liquid electrolyte-type electrical double-layer capacitors are constructed of a nonaqueous liquid electrolyte and positive and negative polarizable electrodes composed largely of a carbonaceous material such as activated carbon. The composition of the nonaqueous liquid electrolyte is known to have a large influence on the withstand voltage and electrostatic capacitance of the capacitor.

The nonaqueous liquid electrolyte is composed of an electrolyte salt and a nonaqueous organic solvent. Studies have hitherto been conducted on various combinations of such electrolyte salts and nonaqueous organic solvents.

For example, quaternary ammonium salts (e.g., JP-A 61-32509, JP-A 63-173312, JP-A 10-55717) and quaternary phosphonium salts (e.g., JP-A 62-252927) are commonly used as the electrolyte salt because of their solubility and degree of dissociation in organic solvents, as well as their broad electrochemical stability range.

Examples have also been reported in which dialkylimidazolium salts, which are ionic liquids, are used as the electrolyte salt (JP-A 6-61095, JP-A 2002-110472).

However, in electrical double-layer capacitors where solid quaternary salts are used as the electrolyte salt, the quaternary salt readily deposits out of solution at low temperatures, and particularly at very low temperatures of −20° C. or less. Even in the absence of such deposition, the electrical conductivity falls off dramatically at low temperatures.

When dialkylimidazolium salts, as ionic liquids, are used to resolve this problem, mixed systems of these salts with inorganic salts are very sensitive to such factors as humidity in the air, and are thus difficult to handle. Moreover, imidazolium salts themselves have drawbacks; namely they have melting points which are not as low as might be desired, and they also have a relatively narrow potential window.

The polarizable electrodes are generally composed of activated carbon. This activated carbon is made by carbonizing any of various suitable starting materials, examples of which include natural substances such as coconut shells and sawdust, synthetic resins such as phenolic resins and polyimide resins, and also coal- and petroleum-based pitch, mesophase carbon, carbon fibers and discarded tires. The carbonized material is then activated, such as by gas activation with steam or carbon dioxide, or by chemical activation using zinc chloride, potassium hydroxide or phosphoric acid. The larger the specific surface area of the activated carbon, the greater the electrostatic capacitance tends to be, although this relationship has yet to be fully investigated.

It is therefore one object of the invention to provide electrical double-layer capacitors endowed with excellent low-temperature characteristics and a high electrostatic capacitance.

DISCLOSURE OF THE INVENTION

In order to achieve the above object, the inventors have conducted extensive investigations on the relationship at low temperatures between the electrolyte salt and the pore distribution in the activated carbon. As a result, they have found that when quaternary ammonium salts and quaternary phosphonium salts bearing at least one alkoxyalkyl group as a substituent are used as the electrolyte salt, and when the activated carbon making up the polarizable electrodes is one having micropores with a pore radius distribution peak as determined by what is known as the "MP method" within a specific range, electrical double-layer capacitors can be obtained which have, at low temperatures, excellent charge-discharge characteristics and a low internal impedance.

Accordingly, the invention provides the following:

(1) An electrical double-layer capacitor having a pair of polarizable electrodes, a separator between the polarizable electrodes and a liquid electrolyte, which electrical double-layer capacitor is characterized in that the polarizable electrodes contain as a main component an activated carbon having micropores with a pore radius distribution peak as determined by the method within a range of $4.0 \times 10^{-10}$ to $8.0 \times 10^{-10}$ m, and the liquid electrolyte includes an electrolyte salt which is an ionic liquid.

(2) The electrical double-layer capacitor of (1) above which is characterized in that the ionic liquid is a quaternary ammonium salt or a quaternary phosphonium salt.

(3) The electrical double-layer capacitor of (2) above which is characterized in that the ionic liquid has general formula (1) below wherein $R^1$ to $R^4$ are each independently an alkyl group of 1 to 5 carbons or an alkoxyalkyl group of the formula $R'—O—(CH_2)_n—$ (R' being methyl or ethyl, and the letter n being an integer from 1 to 4), and any two from among $R^1$, $R^2$, $R^3$ and $R^4$ may together form a ring, with the proviso that at least one of $R^1$ to $R^4$ is the alkoxyalkyl group of the above formula; X is a nitrogen atom or a phosphorus atom; and Y is a monovalent anion.

(4) The electrical double-layer capacitor of (3) above which is characterized in that the ionic liquid has general formula (2) below wherein Me stands for methyl and Et stands for ethyl.

(5) The electrical double-layer capacitor of any one of (1) to (4) above which is characterized in that the pore radius distribution peak is in a range of $4.5 \times 10^{-10}$ to $7.0 \times 10^{-10}$.

(6) The electrical double-layer capacitor of any one of (1) to (5) above which is characterized in that the ionic liquid has a concentration in the liquid electrolyte of from 0.5 to 2.0 mol/L.

(7) The electrical double-layer capacitor of any one of (1) to (6) above which is characterized in that the activated carbon is an activated form of a synthetic resin.

(8) The electrical double-layer capacitor of (7) above which is characterized in that the activated carbon is a steam-activated form of a synthetic resin.

(9) The electrical double-layer capacitor of (7) or (8) above which is characterized in that the synthetic resin is a phenolic resin and/or a polycarbodiimide resin.

BRIEF DESCRIPTION OF THE DIAGRAMS

BEST MODE FOR CARRYING OUT THE INVENTION

The invention is described more fully below.

As described above, the electrical double-layer capacitor according to this invention has a pair of polarizable electrodes, a separator between the polarizable electrodes and a liquid electrolyte, and is characterized in that the polarizable electrodes contain as a main component an activated carbon having micropores with a pore radius distribution peak as determined by the MP method within a range of $4.0 \times 10^{-10}$ to $8.0 \times 10^{-10}$ m, and the liquid electrolyte includes an electrolyte salt which is an ionic liquid.

The ionic liquid, although not subject to any particular limitation, is preferably a quaternary ammonium salt or a quaternary phosphonium salt, and most preferably an ionic liquid of general formula (1) below.

In formula (1), $R^1$ to $R^4$ are each independently an alkyl group of 1 to 5 carbons or an alkoxyalkyl group of the formula $R'$—O—$(CH_2)_n$— ($R'$ being methyl or ethyl, and the letter n being an integer from 1 to 4), and any two from among $R^1$, $R^2$, $R^3$ and $R^4$ may together form a ring, with the proviso that at least one of $R^1$ to $R^4$ is the alkoxyalkyl group of the above formula. X is a nitrogen atom or a phosphorus atom, and Y is a monovalent anion.

Examples of alkyls having 1 to 5 carbons include methyl, ethyl, propyl, 2-propyl, butyl and pentyl. However, given that a smaller ionic radius affords better ionic mobility within the liquid electrolyte, it is preferable for at least one of groups $R^1$ to $R^4$ to be methyl, ethyl or propyl, and especially methyl or ethyl. The ethyl or propyl group may form a ring with another alkyl group.

Examples of alkoxyalkyl groups of the formula $R'$—O—$(CH_2)_n$— include methoxymethyl, ethoxymethyl, methoxyethyl, ethoxyethyl, methoxypropyl, ethoxypropyl, methoxybutyl and ethoxybutyl. The letter n is an integer from 1 to 4. However, to increase the stability of the ionic liquid, the letter n is preferably 1 or 2, and most preferably 2.

Exemplary compounds in which any two groups from among $R^1$ to $R^4$ form a ring include, when X is a nitrogen atom, quaternary ammonium salts containing an aziridine, azetidine, pyrrolidine or piperidine ring; and, when X is a phosphorus atom, quaternary phosphonium salts containing a pentamethylenephosphine (phosphorinane) ring.

Specific examples of quaternary ammonium salts and quaternary phosphonium salts highly suitable for use in the invention include compounds (2) to (11) below (wherein Me stands for methyl and Et stands for ethyl). The quaternary salt of formula (2) below, which bears as substituents a methyl group, two ethyl groups and a methoxyethyl group and which includes as the anion $BF_4^-$, is especially preferred. The use of this ionic liquid as the electrolyte salt enables electrical double-layer capacitors having excellent charge-discharge characteristics at even lower temperatures to be obtained.

-continued (11)

Illustrative, non-limiting examples of the monovalent anion Y include $BF_4^-$, $PF_6^-$, $AsF_6^-$, $SbF_6^-$, $AlCl_4^-$, $HSO_4^-$, $ClO_4^-$, $CH_3SO_3^-$, $CF_3SO^{3-}$, $CF_3CO_2^-$, $(CF_3SO_2)_2N^-$, $Cl^-$, $Br^-$ and $I^-$. To provide such properties as a good degree of dissociation and good stability in nonaqueous organic solvents, the use of $BF_4^-$, $PF_6^-$, $(CF_3SO_2)_2N^-$, $CF_3SO_3^-$ or $CF_3CO_2^-$ is preferred.

Of these anions, the use of $(CF_3SO_2)_2N^-$ is highly preferable for further reducing the viscosity of the ionic liquid and increasing its handleability. $BF_4^-$ is also highly preferable because the resulting ionic liquid has a high versatility and it is less readily affected by water than ionic liquids containing $PF_6^-$ as the anion and thus easier to handle.

A common method for synthesizing such quaternary ammonium salts is described. First, a tertiary amine is mixed with a compound such as an alkyl halide or a dialkyl sulfate and reacted under heating, if necessary, to give a quaternary ammonium halide. In cases where a compound having a low reactivity (e.g., an alkoxyethyl halide or an alkoxymethyl halide) is used, reaction under applied pressure, such as in an autoclave, is preferred.

The resulting quaternary ammonium halide is dissolved in an aqueous solvent such as water, then reacted with a reagent that generates the required anionic species, such as tetrafluoroboric acid or tetrafluorophosphoric acid, so as to effect an anion exchange reaction, yielding the quaternary ammonium salt. Alternatively, if the quaternary ammonium halide is soluble in an organic solvent, the halide may be reacted with a silver salt of the required anionic species so as to effect an anion exchange reaction and thereby yield the quaternary ammonium salt.

In one illustrative method for synthesizing quaternary ammonium tetrafluoroborates, a quaternary ammonium halide is dissolved in water, silver oxide is added and a salt exchange reaction is carried out to form the corresponding quaternary ammonium hydroxide. The product is then reacted with tetrafluoroboric acid, yielding the target compound. This method is effective for synthesizing high-purity quaternary ammonium tetrafluoroborates because the silver halide that arises as a result of salt exchange during formation of the quaternary ammonium hydroxide can easily be removed.

Quaternary phosphonium salts can generally be synthesized in much the same way as quaternary ammonium salts. Typically, a tertiary phosphine is mixed with a suitable compound such as an alkyl halide or a dialkyl sulfate. If necessary, the reaction is carried out under the application of heat.

As in the case of quaternary ammonium salts, quaternary phosphonium salts containing any of various suitable anions may be prepared by dissolving a quaternary phosphonium halide (a chloride, bromide or iodide) in an aqueous solvent and reacting the dissolved halide with a reagent that generates the required anionic species so as to effect an anion exchange reaction.

The above ionic liquid has a melting point not higher than 50° C., preferably not higher than 30° C., and most preferably not higher than 20° C. If the melting point is higher than 50° C., the ionic liquid will deposit out within the electrolyte at low temperatures, increasing the likelihood of a decline in the ionic conductivity. The lower the melting point, the more desirable. The melting point has no particular lower limit.

Because the above-described ionic liquid has a lower melting point than imidazolium ion-containing ionic liquids already familiar to the art, by using an electrolyte containing the above ionic liquid, there can be obtained electrical double-layer capacitors having even better low-temperature characteristics.

Also, because the above ionic liquid has a broader potential window than ionic liquids containing imidazolium ions, it does not readily undergo reductive decomposition during charging and discharging. As a result, a highly stable electrical double-layer capacitor can be obtained.

The liquid electrolyte of the inventive electrical double-layer capacitor includes an ionic liquid and a nonaqueous organic solvent. Any nonaqueous organic solvent which is capable of dissolving the ionic liquid and is stable within the working voltage range of the electrical double-layer capacitor may be used without particular limitation. However, it is preferable for the nonaqueous organic solvent to be one having a high dielectric constant, a broad electrochemical stability range, a broad service temperature range and excellent safety.

Illustrative examples of suitable solvents include nitrites such as acetonitrile and propionitrile; acyclic ethers such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahydrofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and other solvents commonly used in electrochemical devices, such as amide solvents (e.g., N-methylformamide, N,N-dimethylformamide, N-methylacetamide, N-methylpyrrolidinone), carbonate solvents (e.g., diethyl carbonate, dimethyl carbonate, ethyl methyl carbonate, propylene carbonate, ethylene carbonate, styrene carbonate), and imidazolidinone solvents (e.g., 1,3-dimethyl-2-imidazolidinone). Any one or mixtures of two or more of these solvents may be used.

Of these solvents, propylene carbonate is especially preferred because it has a good ability to dissolve the electrolyte salt even at very low temperatures of −20° C. or less, an excellent electrical performance, and a relatively high flash point during use at elevated temperatures.

No particular limitation is imposed on the concentration of the ionic liquid within the liquid electrolyte, although the concentration is preferably 0.5 to 2.0 mol/L, more preferably 0.75 to 1.75 mol/L, and even more preferably 0.9 to 1.5 mol/L.

At an ionic liquid concentration of less than 0.5 mol/L, energy loss may occur due to increased internal resistance. On the other hand, at a concentration of more than 2.0 mol/L, undesirable effects may arise, such an increase in viscosity and a decrease in electrical conductivity.

It is also possible to use the ionic liquid alone as the liquid electrolyte without using a solvent.

The polarizable electrodes used in the electrical double-layer capacitor of the invention contain as a main component an activated carbon having micropores with a pore radius distribution peak as determined by the MP method within a range of $4.0 \times 10^{-10}$ to $8.0 \times 10^{-10}$ m (4.0 to 8.0 Å), preferably $4.5 \times 10^{-10}$ to $7.0 \times 10^{-10}$ m (4.5 to 7.0 Å), more preferably $4.5 \times 10^{-10}$ to $6.5 \times 10^{-10}$ m (4.5 to 6.5 Å), and even more preferably $4.5 \times 10^{-10}$ to $5.0 \times 10^{-10}$ m (4.5 to 5.0 Å).

"MP method," as used herein, refers to a method commonly used in micropore analysis. The results of BET measurements are t-plotted and the curvature in areas near bends in the plot is analyzed, based upon which the pore radius distribution and the pore radius distribution peak are computed. The pore radius distribution and peak here are values determined from the results of BET measurements based on nitrogen adsorption.

If the resulting peak in the pore radius distribution for micropores in the activated carbon is lower than $4.0 \times 10^{-10}$, the charge-discharge characteristics at low temperatures may worsen. On the other hand, at a pore radius distribution peak higher than $8.0 \times 10^{-10}$, maintaining a large specific surface area in the activated carbon is difficult. Accordingly, the electrostatic capacitance may decrease on account of the smaller specific surface area.

The activated carbon may be prepared from any suitable starting material, provided the pore radius distribution peak can be set within the above-indicated range. Starting materials that may be used include coconut shells, coffee beans, sawdust, petroleum pitch, petroleum coke and coal, although it is preferable for the activated carbon to be prepared by carbonizing a synthetic resin as the starting material, then activating the carbonized resin.

Any of various synthetic resins known to be suitable as starting materials for producing activated carbon may be used. Illustrative examples include synthetic polymers, phenolic resins, furan resins, polyvinyl chloride resins, polyvinylidene chloride resins, polyimide resins, polyamide resins, liquid crystal polymers, plastic waste and discarded tires. From the standpoint of cost, versatility, and ease of activation, phenolic resins and/or polycarbodiimide resins are preferred.

The method of activation is not subject to any particular limitation. Examples of such techniques that may be used include chemical activation using a suitable chemical such as potassium hydroxide, zinc chloride or phosphoric acid, and gas activation using a suitable gas such as carbon dioxide, oxygen or steam. Steam activation is preferred because the pore radius of the activated carbon can easily be controlled within the above-indicated range.

Activated carbon exists in a variety of forms, including crushed material, granulated material, pellets, fibers, felt, woven fabric and sheets, any of which may be used in the invention.

The above-described polarizable electrodes are largely composed of activated carbon having the above-indicated pore radius distribution, and may be of a type fabricated by blending a binder polymer into this activated carbon to form a polarizable electrode composition, then coating the composition onto a current collector.

Here, the binder polymer may be any known binder polymer capable of being used in applications to which this invention relates. Illustrative examples include polytetrafluoroethylene, polyvinylidene fluoride, carboxymethyl cellulose, fluoroolefin copolymer-crosslinked polymers, polyvinyl alcohols, polyacrylic acids, polyimides, petroleum pitch, coal pitch, and phenolic resins.

These binder polymers are preferably added in any amount of 0.5 to 20 parts by weight, and especially 1 to 10 parts by weight, per 100 parts by weight of the activated carbon.

The method of preparing the polarizable electrode composition is not subject to any particular limitation. For example, the composition may be prepared in the form of a solution from the above-described activated carbon and a binder polymer, or it may be prepared by adding a solvent, if necessary, to this solution.

The polarizable electrode composition thus obtained is coated onto a current collector to form a polarizable electrode. Any suitable known coating method may be used at this time, such as doctor blade coating or air knife coating.

Any current collector commonly used in electrical double-layer capacitors may be selected for use as the current collector in the positive and negative electrodes. The positive electrode current collector is preferably aluminum foil or aluminum oxide, and the negative electrode current collector is preferably copper foil, nickel foil or a metal foil covered on the surface with a copper plating film or a nickel plating film.

The foils making up the respective current collectors may be in any of various forms, including thin foils, flat sheets, and perforated, stampable sheets. The foil has a thickness of generally about 1 to 200 μm. However, taking into account, for example, the density of the activated carbon over the entire electrode and the strength of the electrode, a thickness of 8 to 100 μm is preferred, and a thickness of 8 to 30 is especially preferred.

Alternatively, the polarizable electrodes can be fabricated by melting and blending the polarizable electrode composition, then extruding the blend as a film.

A conductive material may be added to the above-described carbonaceous material. The conductive material may be any suitable material capable of conferring electrical conductivity to the carbonaceous material. Illustrative, non-limiting, examples include carbon black, Ketjenblack, acetylene black, carbon whiskers, carbon fibers, natural graphite, artificial graphite, titanium oxide, ruthenium oxide, and metallic fibers such as aluminum or nickel fibers. Any one or combinations of two or more thereof may be used. Of these, Ketjenblack and acetylene black, both of which are types of carbon black, are preferred.

The average particle size of the conductive material is not subject to any particular limitation, although a size of 10 nm to 10 μm, preferably 10 to 100 nm, and more preferably 20 to 40 nm, is desirable. In particular, it is advantageous for the conductive material to have an average particle size which is from 1/5000 to 1/2, and preferably from 1/1000 to 1/10, as large as the average particle size of the activated carbon.

The amount of conductive material included is not subject to any particular limitation, although addition of the conductive material in an amount of 0.1 to 20 parts by weight, and preferably 0.5 to 10 parts by weight, per 100 parts by weight of the activated carbon is desirable in light of such considerations as the electrostatic capacitance and the conductivity-imparting effects.

The separator may be one that is commonly used in electrical double-layer capacitors. Illustrative examples include polyolefin nonwoven fabric, polytetrafluoroethylene porous film, kraft paper, sheet laid from a blend of rayon fibers and sisal hemp fibers, manila hemp sheet, glass fiber sheet, cellulose-based electrolytic paper, paper made from rayon fibers, paper made from a blend of cellulose and glass fibers, and combinations thereof in the form of multilayer sheets.

The electrical double-layer capacitor of the invention can be assembled by stacking, fan-folding or winding an electrical double-layer capacitor assembly composed of a pair of polarizable electrodes produced as described above and a separator therebetween. The cell assembly is then placed within a capacitor housing such as a can or a laminate pack. Next, the assembly is filled with the liquid electrolyte, following which the housing is mechanically sealed if it is a can or heat-sealed if it is a laminate pack.

The electrical double-layer capacitors of the invention are highly suitable for use as a memory backup power supply for cell phones, notebook computers and wireless terminals, as a power supply for cell phones and portable acoustic devices, as an uninterruptible power supply for personal computers and other equipment, and as various types of low-current electrical storage devices such as load leveling power supplies used in combination with solar power generation and wind power generation. Moreover, electrical double-layer capacitors capable of being charged and discharged at a high current are well suited for use as high-current electrical storage devices in applications that require a large current such as electric cars and electrical power tools.

As described above, because the electrical double-layer capacitor of the invention uses polarizable electrodes that are largely composed of activated carbon in which the micropores have a specific pore radius distribution peak, and because it uses a liquid electrolyte that contains an ionic liquid, the capacitor has excellent charge-discharge characteristics at low temperatures and the internal impedance at low temperatures can be minimized.

Moreover, because ionic liquids composed of a quaternary ammonium salt or quaternary phosphonium salt have a broader potential window than imidazolium or pyridinium-type ionic liquids, the use of such ionic liquids as the electrolyte enables electrical double-layer capacitors of a high energy density to be obtained.

EXAMPLE

The following synthesis examples, examples of the invention and comparative examples are provided to illustrate the invention and do not in any way limit the invention.

Synthesis Example 1

Synthesis of Compound (2)

(2)

A solution prepared by mixing together 100 ml of diethylamine (Kanto Chemical Co., Inc.) and 85 ml of 2-methoxyethyl chloride (Kanto Chemical Co. Inc.) was placed in an autoclave and reacted at 100° C. for 24 hours. The internal pressure during the reaction was 0.127 MPa (1.3 kgf/cm$^2$). This yielded a mixture of deposited crystals and reaction solution to which was added, following the 24 hours of reaction, 200 ml of an aqueous solution containing 56 g of dissolved calcium hydroxide (Katayama Chemical Industries Co., Ltd.). The two organic phases that formed as a result were separated with a separatory funnel and subjected twice to extraction with 100 ml of methylene chloride (Wako Pure Chemical Industries, Ltd.). The separated organic phases were then combined and washed with a saturated saline solution, following which potassium carbonate (Wako Pure Chemical Industries, Ltd.) was added to remove water, and vacuum filtration was carried out. The solvent in the resulting organic phase was distilled off using a rotary evaporator, after which the residue was subjected to normal-pressure distillation, yielding 18.9 g of a fraction having a boiling point close to 135° C. This compound was confirmed from a $^1$H-nuclear magnetic resonance (abbreviated hereinafter as "NMR") spectrum to be 2-methoxyethyldiethylamine.

Next, 8.24 g of the 2-methoxyethyldiethylamine was dissolved in 10 ml of tetrahydrofuran (Wako Pure Chemical Industries, Ltd.), then 4.0 ml of methyl iodide (Wako Pure Chemical Industries, Ltd.) was added under ice cooling. After 30 minutes, the mixture was removed from the ice bath and stirred overnight at room temperature. The solvent in the resulting reaction solution was subsequently driven off by vacuum distillation, and the resulting solids were recrystallized from an ethanol (Wako Pure Chemical Industries, Ltd.)—tetrahydrofuran system, yielding 16 g of 2-methoxyethyldiethylmethylammonium iodide.

Next, 15.0 g of the 2-methoxyethyldiethylmethyl-ammonium iodide was dissolved in 100 ml of distilled water, following which 6.37 g of silver oxide (Kanto Chemical Co. Inc.) was added and stirring carried out for 3 hours. The reaction mixture was then vacuum filtered to remove the precipitate, following which 42% tetrafluoroboric acid (Kanto Chemical Co. Inc.) was gradually added under stirring until the reaction solution reached a pH of about 5 to 6. This reaction solution was subsequently freeze-dried, in addition to which water was thoroughly driven off using a vacuum pump, yielding 12.39 g of a compound (2) that was liquid at room temperature (25° C.).

Figure 1:
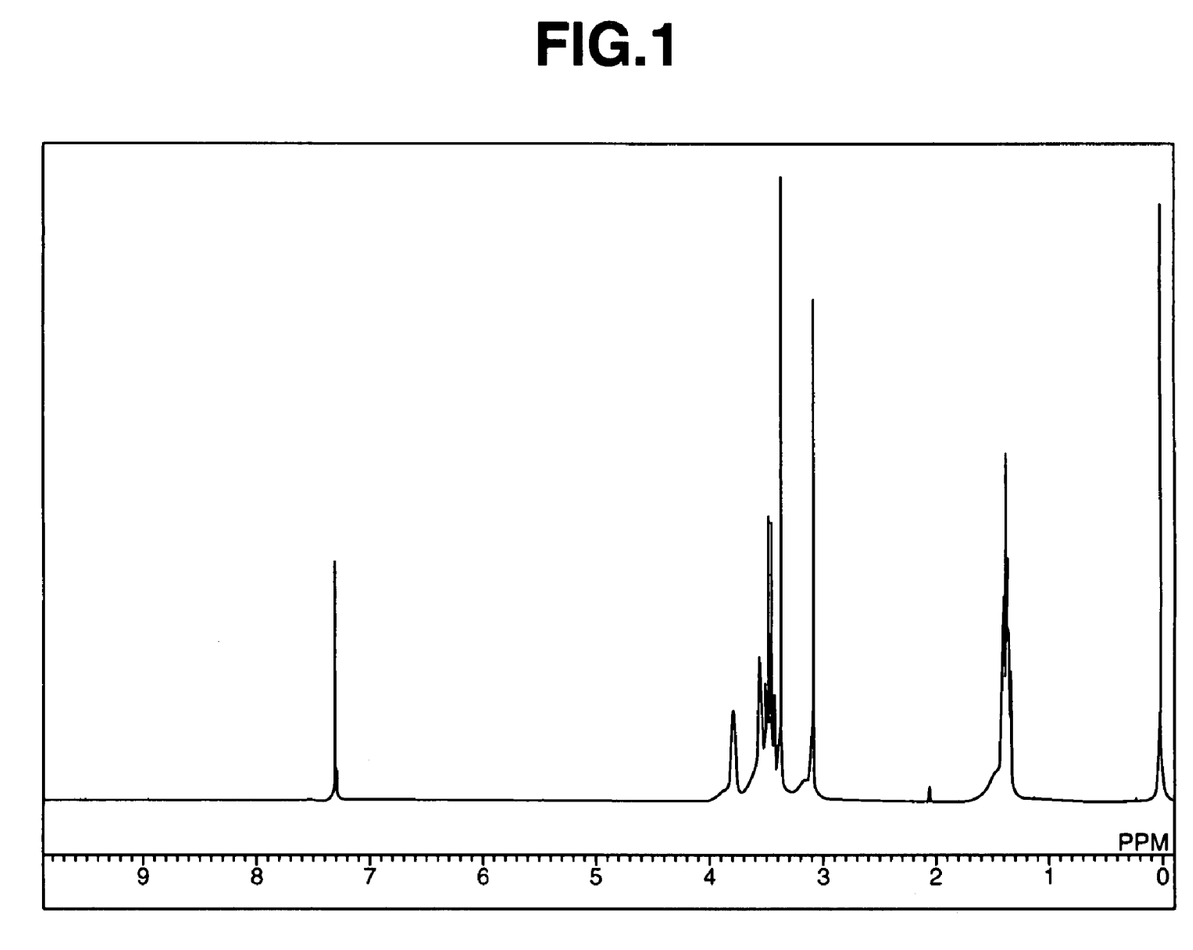
FIG. 1 is a chart showing the NMR spectrum of compound (2).

FIG. 1 shows the NMR spectrum (solvent: deuterated chloroform) of compound (2).

Synthesis Example 2

Synthesis of Compound (11)

(11)

First, 100 ml of a 2.0 M dimethylamine-tetrahydrofuran solution (Aldrich Chemical Co., Ltd.) and 9.1 ml of 2-methoxyethyl chloride (Kanto Chemical Co. Inc.) were mixed, and the mixture was reacted in an autoclave at 100° C. for 12 hours. The internal pressure during the reaction was 0.36 MPa (3.7 kgf/cm$^2$). The crystals that had formed in the reaction solution after 12 hours of reaction were filtered off, and the filtrate was subjected to distillation so as to remove most of the tetrahydrofuran, thereby giving a clear liquid that was a dimethyl-2-methoxyethyl mixture.

Next, 8.0 ml of methyl iodide (Wako Pure Chemical Industries, Ltd.) was added to this liquid under ice cooling, following which the ice bath was removed and the mixture was stirred overnight. The resulting reaction mixture was vacuum distilled, giving 3.04 g of the salt 2-methoxyethylethyldimethylammonium iodide as an oil.

Next, 2.28 g of silver tetrafluoroborate was weighed out, 30 ml of a 1:1 (by volume) chloroform-acetonitrile mixed solvent was added and the mixture was stirred. To the resulting suspension was added a solution of 3.04 g of the 2-methoxyethylethyldimethylammonium iodide prepared above in 30 ml of 1:1 chloroform-acetonitrile, and the resulting mixture was stirred for 80 minutes. The crystals that formed were removed by vacuum filtration, following which the solvent within the filtrate was driven off with an evaporator and a vacuum pump.

Next, 2.85 g of the residue was purified by silica gel column chromatography using Wakogel (C-200, produced by Wako Pure Chemical Industries, Ltd.) and a 1:1 (by volume) mixture of chloroform and methanol as the eluting solvent, yielding 1.57 g of compound (11) which was liquid at room temperature (25° C.).

Figure 2:
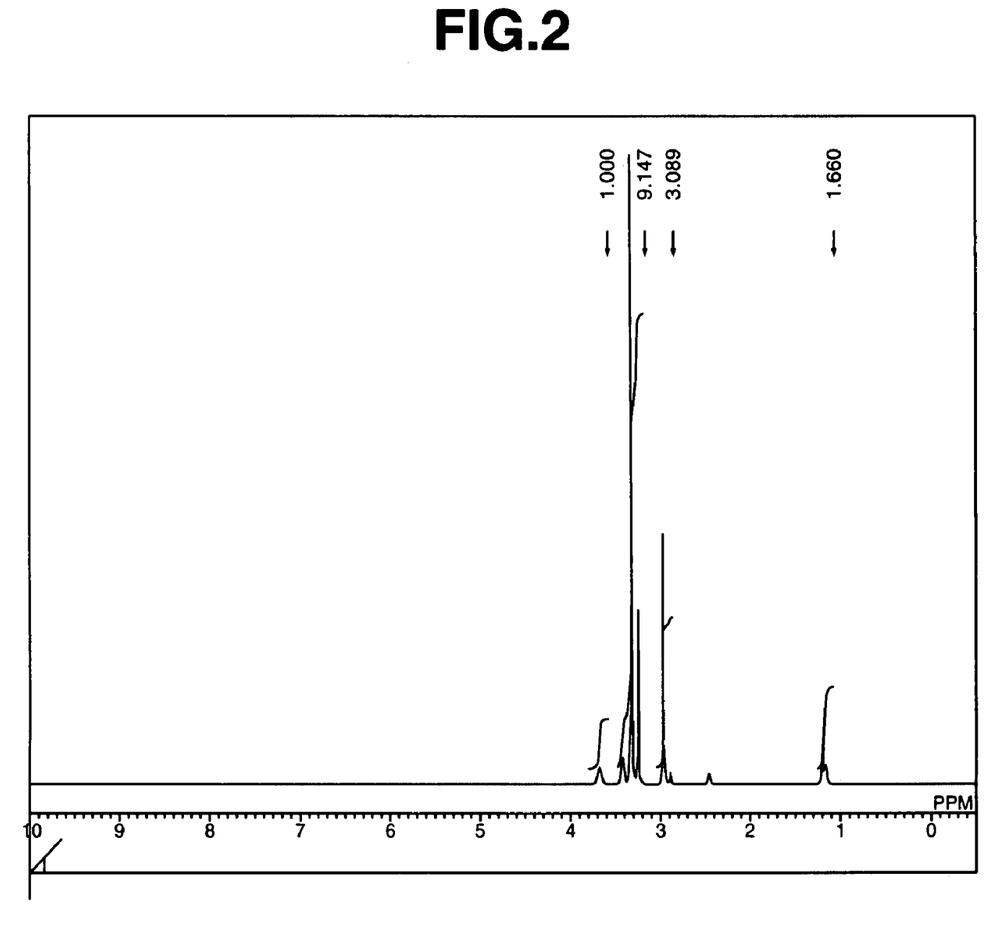
FIG. 2 is a chart showing the NMR spectrum of compound (11).

FIG. 2 shows the NMR spectrum (solvent: deuterated dimethyl sulfoxide) of compound (11).

Example 1

A filling material was prepared by mixing an activated carbon (indicated below as "Activated Carbon 1") obtained by steam activating a carbonized phenolic resin for 2 hours and having the specific surface area and the pore distribution peak value shown in Table 1, a conductive material (HS-100, made by Denki Kagaku Kogyo Kabushiki Kaisha) and a binder (PVdF900, made by Kureha Chemical Industries Co., Ltd.) in a weight ratio of 90:5:5, respectively. This filling material was then mixed with N-methyl-2-pyrrolidone (abbreviated hereinafter as "NMP"; made by Katayama Chemical Industries Co., Ltd.) in a weight ratio (filling material/NMP) of 100:212.5 to form a slurry.

The slurry was applied onto 30 μm aluminum foil to an electrode thickness of 100 μm, vacuum dried at 140° C. for 3 days, then subjected to 30 MPa of stress using a roll press.

The slurry-coated aluminum foil was vacuum dried once again at 170° C. for 3 days, following which 12 mm diameter electrodes were punched on a punching machine. The punched disks were then vacuum dried at 120° C. for 2 hours, thereby giving test electrodes.

Next, using a two-electrode coin cell housing (Hokuto Denko Corporation), a coin cell was assembled from the above-described electrodes together with an intervening cellulose separator (FT40-35, made by Nippon Kodoshi Corporation) and a 1.0 M propylene carbonate (abbreviated hereinafter as "PC"; made by Kishida Chemical Co., Ltd.) solution of Compound (2) as the liquid electrode so as to form an electrical double-layer capacitor sample.

Example 2

Aside from using as the activated carbon in the electrodes an activated carbon (indicated below as "Activated Carbon 2") prepared by steam activating carbonized phenolic resin for 3 hours and using Compound (11) as the electrolyte salt in the liquid electrolyte, an electrical double-layer capacitor sample was fabricated in the same way as in Example 1.

Example 3

Aside from using as the activated carbon within the electrodes an activated carbon (indicated below as "Activated Carbon 3") prepared by subjecting alkali-activated carbon (MSP-20, produced by Kansai Coke and Chemicals Co., Ltd.) to 1 hour of steam activation as well so as to broaden the pore size distribution, an electrical double-layer capacitor sample was fabricated in the same way as in Example 1.

Example 4

Aside from using as the activated carbon within the electrodes an activated carbon (indicated below as "Activated Carbon 3") prepared by subjecting alkali-activated carbon (MSP-20, made by Kansai Coke and Chemicals Co., Ltd.) to 1 hour of steam activation as well so as to broaden the pore size distribution and using Compound (11) as the electrolyte salt within the liquid electrolyte, an electrical double-layer capacitor sample was fabricated in the same way as in Example 1.

Comparative Example 1

Aside from using as the activated carbon in the electrodes an alkali-activated carbon (MSP-20, made by Kansai Coke and Chemicals Co., Ltd.) that had not been further activated (indicated below as "Activated Carbon 4"), an electrical double-layer capacitor sample was fabricated in the same way as in Example 1.

Comparative Example 2

Aside from using as the liquid electrolyte a 1.0 M solution (LIPASTE-P/EAFIN, produced by Toyama Chemical Co., Ltd.) of tetraethylammonium tetrafluoroborate (TEA) in propylene carbonate, an electrical double-layer capacitor sample was fabricated in the same way as in Example 1.

Comparative Example 3

Aside from using as the activated carbon in the electrodes an activated carbon prepared by subjecting carbonized phenolic resin to 6 hours of steam activation (indicated below as "Activated Carbon 5"), an electrical double-layer capacitor sample was fabricated in the same way as in Example 1.

TABLE 1

| Activated carbon | BET specific surface area ($m^2/g$) | Pore radius peak value (Å) |
|---|---|---|
| Activated Carbon 1 | 1642 | 4.64 |
| Activated Carbon 2 | 2120 | 6.30 |
| Activated Carbon 3 | 2201 | 4.95 |
| Activated Carbon 4 | 2280 | 3.74 |
| Activated Carbon 5 | 1620 | 8.31 |

The characteristics of the electrical double-layer capacitors obtained in each of the above examples of the invention and comparative examples were evaluated as described below when charged and discharged in a charge/discharge system (1005SM8, manufactured by Hokuto Denko Corporation).

The method of evaluation was an initial capacitance verification test, carried out in a room temperature environment, in which the capacitor was charged at a current density of 0.88 mA/cm$^2$, a voltage setting of 2.50 V and a constant voltage time of 15 minutes (cut-off conditions), and was discharged at a current density of 0.88 mA/cm$^2$ and an end-of-discharge voltage of 0.0 V.

A low-temperature performance test was carried out in which the test cell was placed within a constant temperature chamber (EC-25MTP, manufactured by Hitachi, Ltd.) and held at −40° C. for about 6 hours, following which charge and discharge were carried out under the same current and voltage conditions as in the initial capacitance verification test. The results obtained from these evaluation tests are shown below in Table 2.

TABLE 2

|  | Activated carbon | Electrolyte salt | Capacitance (F/g) | Retention of capacitance (%) |
|---|---|---|---|---|
| Example 1 | Activated Carbon 1 | Compound 2 | 23.4 | 90 |
| Example 2 | Activated Carbon 2 | Compound 11 | 25.9 | 95 |
| Example 3 | Activated Carbon 3 | Compound 2 | 33.6 | 93 |
| Example 4 | Activated Carbon 3 | Compound 11 | 33.5 | 93 |
| Comparative Example 1 | Activated Carbon 4 | Compound 2 | 35.0 | 48 |
| Comparative Example 2 | Activated Carbon 1 | TEA | 24.2 | 65 |
| Comparative Example 3 | Activated Carbon 5 | Compound 2 | 21.6 | 99 |

As is apparent from Table 2, the electrical double-layer capacitors obtained in Examples 1 to 4 of the invention using activated carbons having a specific pore radius distribution as a main component of the polarizable electrodes and using a quaternary ammonium salt (ionic liquid) as the electrolyte salt all exhibited much better retention of the capacitance at −40° C. than did the electrical double-layer capacitors obtained in the comparative examples. Moreover, the electrical double-layer capacitors obtained in Examples 1 to 4 also had sufficiently high electrostatic capacitances.

Because the electrical double-layer capacitors according to this invention use polarizable electrodes which are largely composed of an activated carbon having micropores with a pore radius distribution peak as determined by the MP method within a range of $4.0 \times 10^{-10}$ to $8.0 \times 10^{-10}$ m and use a liquid electrolyte that includes an electrolyte salt which is an ionic liquid, they have excellent charge-discharge characteristics at low temperatures and their internal impedance at low temperatures can be minimized.

The invention claimed is:

1. An electrical double-layer capacitor comprising:
a pair of polarizable electrodes;
a separator between the polarizable electrodes; and
a liquid electrolyte, wherein
the polarizable electrodes contain as a main component an activated carbon having micropores with a pore radius distribution peak as determined by an MP method within a range of $4.0 \times 10^{-10}$ to $8.0 \times 10^{-10}$ m, and
the liquid electrolyte includes a quaternary ammonium electrolyte salt which is an ionic liquid.

2. The electrical double-layer capacitor of claim 1, wherein the ionic liquid has a melting point of 50° C. or less.

3. The electrical double-layer capacitor of claim 2, wherein the ionic liquid is represented by general formula (1) below:

(1)

wherein $R^1$ to $R^4$ are each independently an alkyl group of 1 to 5 carbons or an alkoxyalkyl group of the formula $R'—O—(CH_2)_n$, (R' being methyl or ethyl, and the letter n being an integer from 1 to 4), and any two from among $R^1$, $R^2$, $R^3$ and $R^4$ may together form a ring, with the proviso that at least one of $R^1$ to $R^4$ is the alkoxyalkyl group of the above formula; and Y is a monovalent anion.

4. The electrical double-layer capacitor of claim 3, wherein the ionic liquid is represented by general formula (2) below:

(2)

wherein Me stands for methyl and Et stands for ethyl.

5. The electrical double-layer capacitor of any one of claims 1 to 4, wherein the pore radius distribution peak is in a range of $4.5 \times 10^{-10}$ to $7.0 \times 10^{-10}$.

6. The electrical double-layer capacitor of claim 1, wherein the ionic liquid has a concentration in the liquid electrolyte of from 0.5 to 2.0 mol/L.

7. The electrical double-layer capacitor claim 1, wherein the activated carbon is an activated form of a synthetic resin.

8. The electrical double-layer capacitor of claim 7, wherein the activated carbon is a steam activated form of a the synthetic resin.

9. The electrical double-layer capacitor of claim 7, wherein the synthetic resin is at least one elected from the group consisting of phenolic and polycarbodiimide resin.

* * * * *